(12) United States Patent
Lee et al.

(10) Patent No.: US 8,251,598 B2
(45) Date of Patent: Aug. 28, 2012

(54) CAMERA HOLDER

(75) Inventors: Chai-Wei Lee, Taipei Hsien (TW);
Hou-Yao Lin, Taipei Hsien (TW);
Sheng-Jung Yu, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 53 days.

(21) Appl. No.: 12/963,807

(22) Filed: Dec. 9, 2010

(65) Prior Publication Data
US 2011/0255855 A1 Oct. 20, 2011

(30) Foreign Application Priority Data

Apr. 20, 2010 (TW) ................................ 99112257 A

(51) Int. Cl.
*G03B 17/00* (2006.01)
*H04N 5/225* (2006.01)
*F16M 11/00* (2006.01)
(52) U.S. Cl. ......... 396/428; 396/424; 348/373; 248/161

(58) Field of Classification Search .................. 396/428, 396/419, 424, 429; 348/373, 376, 552; 248/649, 248/669, 125.1, 125.2, 125.8, 132, 161, 157, 248/295.11
See application file for complete search history.

(56) References Cited

U.S. PATENT DOCUMENTS 6,714,729 B1 * 3/2004 Sugiura et al. .................. 396/19
* cited by examiner

*Primary Examiner* — Rochelle-Ann J Blackman
(74) *Attorney, Agent, or Firm* — Altis Law Group, Inc.

(57) ABSTRACT

A camera holder includes a supporting frame, a sliding block, and an adjustable assembly. The supporting frame includes a receiving cavity. The sliding block is received in the receiving cavity and slidably attached to the supporting frame. The sliding block and the supporting frame cooperatively support a camera. The adjustable assembly includes a shaft, a gear, a gear rack, a base, and a revolving head. The shaft is attached to the supporting frame. The gear is mechanically coupled to the shaft. The gear rack is meshed with the gear rack. The base is arranged on a horizontal plane and attached to an end of the gear rack to support the supporting frame. The revolving head is attached to the gear, and the revolving head is configured for rotating the gear such that the gear and the gear rack cooperatively raise or lower the camera relative to the horizontal plane.

12 Claims, 4 Drawing Sheets

CAMERA HOLDER

BACKGROUND

1. Technical Field

The disclosure generally relates to camera holders and, particularly, to a camera holder used to hold a mobile phone for clearly picking up close-up images.

2. Description of Related Art

It is well known that many users are interested in picking up close-up images of various objects such as small insects, butterfly wings, coins, postage stamps, and other small detailed objects, using cameras or portable mobile phones with a camera function. However, the cameras or the portable mobile phones may vibrate when picking up images, which may result in blurred images when the images are finally obtained.

Therefore, what is needed, is a camera holder for holding a camera or a mobile phone with a camera function, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The embodiment of the camera holder will now be described in detail below and with reference to the drawings.

Figure 1:
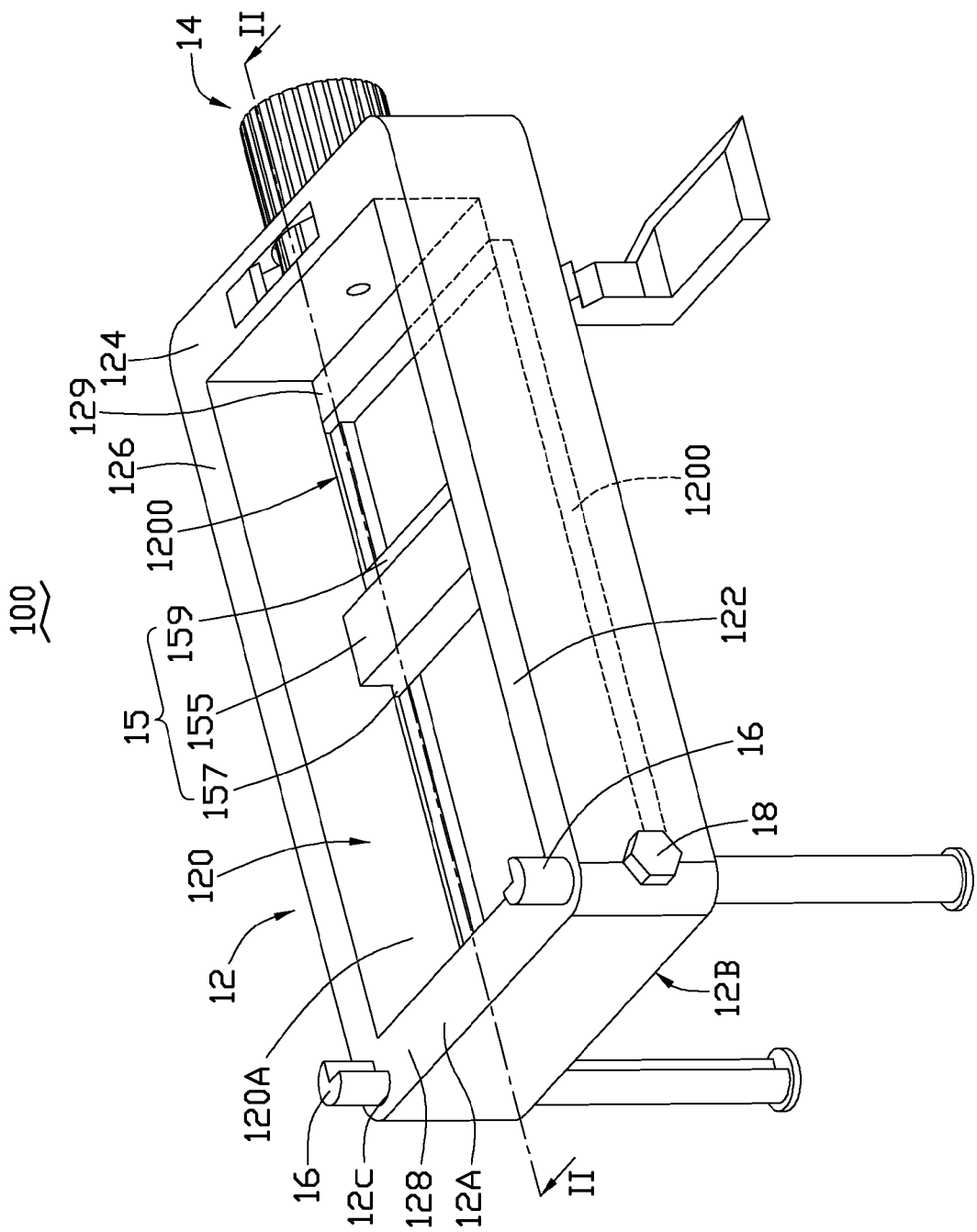
FIG. 1 is an isometric view of a camera holder in accordance with an exemplary embodiment.

Referring to FIG. 1, a camera holder 100 in accordance with an exemplary embodiment is shown. The camera holder 100 includes a supporting frame 12, an adjustable assembly 14, a sliding block 15, and two supporting posts 16.

The supporting frame 12 is substantially cuboid-shaped with a receiving cavity 120 defined therein. In this embodiment, the supporting frame 12 includes a first side portion 122, a second side portion 124, a third side portion 126, and a fourth side portion 128. The first and the third side portions 122, 126 are located between and adjoin the second and the fourth side portions 124, 128. The first side portion 122 is substantially parallel to the third side portion 126. The second side portion 124 is substantially parallel to the fourth side portion 128.

The supporting frame 12 includes a top surface 12A and a bottom surface 12B at opposite sides thereof. The receiving cavity 120 extends all the way through the top surface 12A and the bottom surface 12B. In this embodiment, the receiving cavity 120 is substantially cuboid-shaped. Each of the first, the second, the third side, and the fourth side portions 122, 124, 126, 128 includes an inner side surface 120A in the receiving cavity 120. Each of the inner sides 120A is located between and adjoins the top surface 12A and the bottom surface 12B. Each of the first and the third side portions 122, 126 has a slot 1200 defined in the inner side surface 120A thereof. Each of the slots 1200 is near to the bottom surface 12B and farther from the top surface 12A. The two slots 1200 are substantially parallel to each other. In this embodiment, each of the two slots 1200 extend in a direction from the second side portion 124 and the fourth side portion 128.

The supporting frame 12 further includes a first supporting portion 129 protruding from the inner side surface 120A of the second side portion 124. The first supporting portion 129 extends in a direction from the first side portion 122 and the third side portion 126, and the first supporting portion 129 is near to the bottom surface 12B and farther from the top surface 12A.

Figure 2:
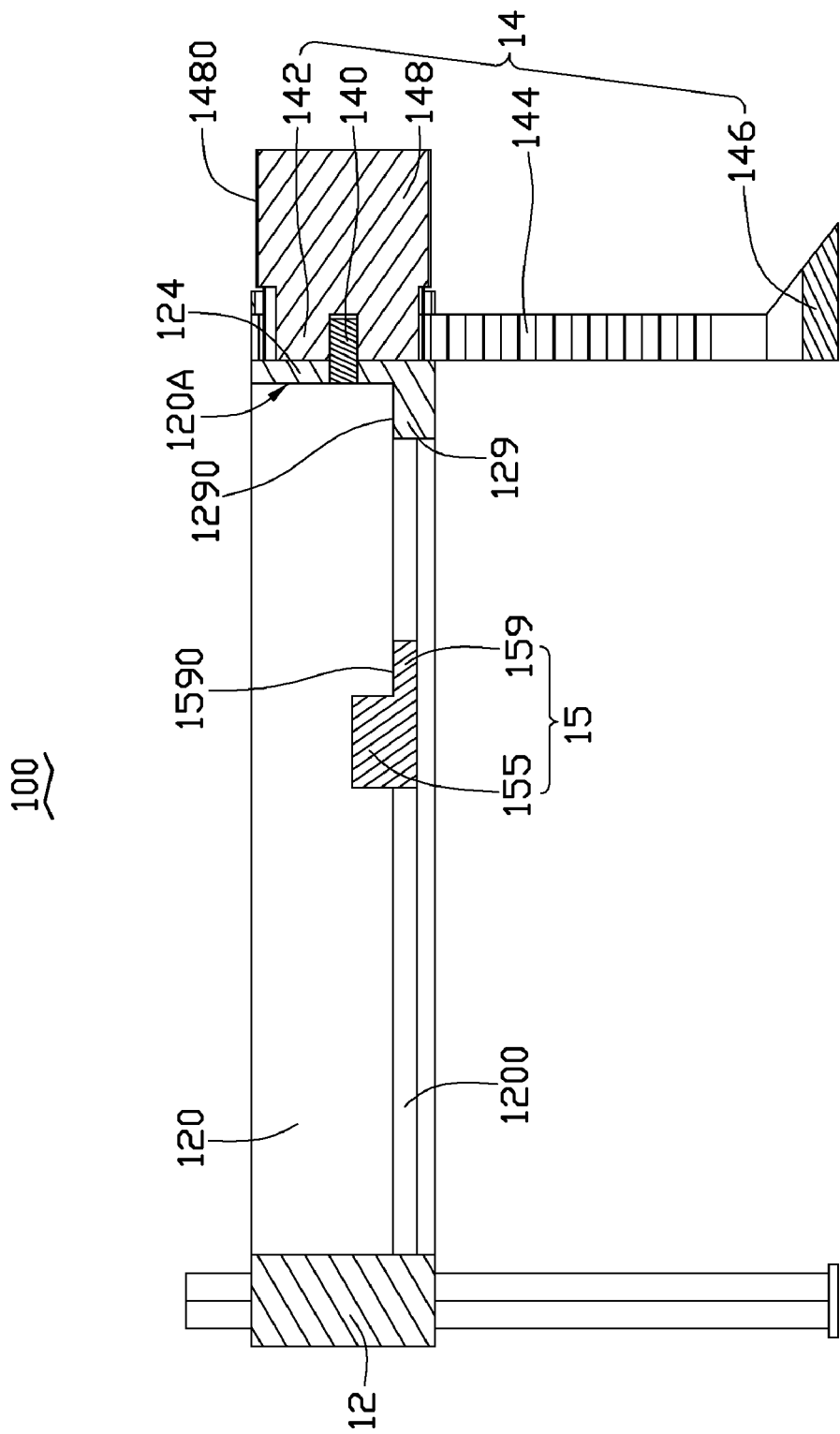
FIG. 2 is a cross-sectional view of the camera holder of FIG. 1, taken along line II-II.

Referring also to FIG. 2, the sliding block 15 is arranged in the receiving cavity 120. In this embodiment, the block 15 includes a main body 155 and a second supporting portion 159 protruding from the main body 155. The first supporting portion 129 and the second supporting portion 159 cooperatively support a mobile phone 20 with a camera function, as shown in FIG. 3.

The block 15 extends in a direction from the first side portion 122 and the third side portion 126. In this embodiment, the block 15 includes two protruding portions 157 (see FIG. 1) protruding from two opposite ends thereof. The two protruding portions 157 are engagingly received in the two slots 1200, thus the block 15 can be slidably attached to the first and the third side portions 122, 126. In this embodiment, when the block 15 slides along the two slots 1200, a supporting surface 1590 of the second supporting portion 159 maintains a common plane with a supporting surface 1290 of the first supporting portion 129 (see FIG. 2).

As shown in FIG. 2, the adjustable assembly 14 includes a shaft 140, a gear 142, a gear rack 144, a base 146, and a revolving head 148. The shaft 140 is attached to the second side portion 124 of the supporting frame 12. The gear 142 is coupled to the shaft 140 and meshed with the gear rack 144. As shown in FIG. 3, in this embodiment, the second side portion 124 has a hole 1240 defined in an outer side surface 120B opposite to the inner side surface 120A for housing the gear 142.

Figure 3:
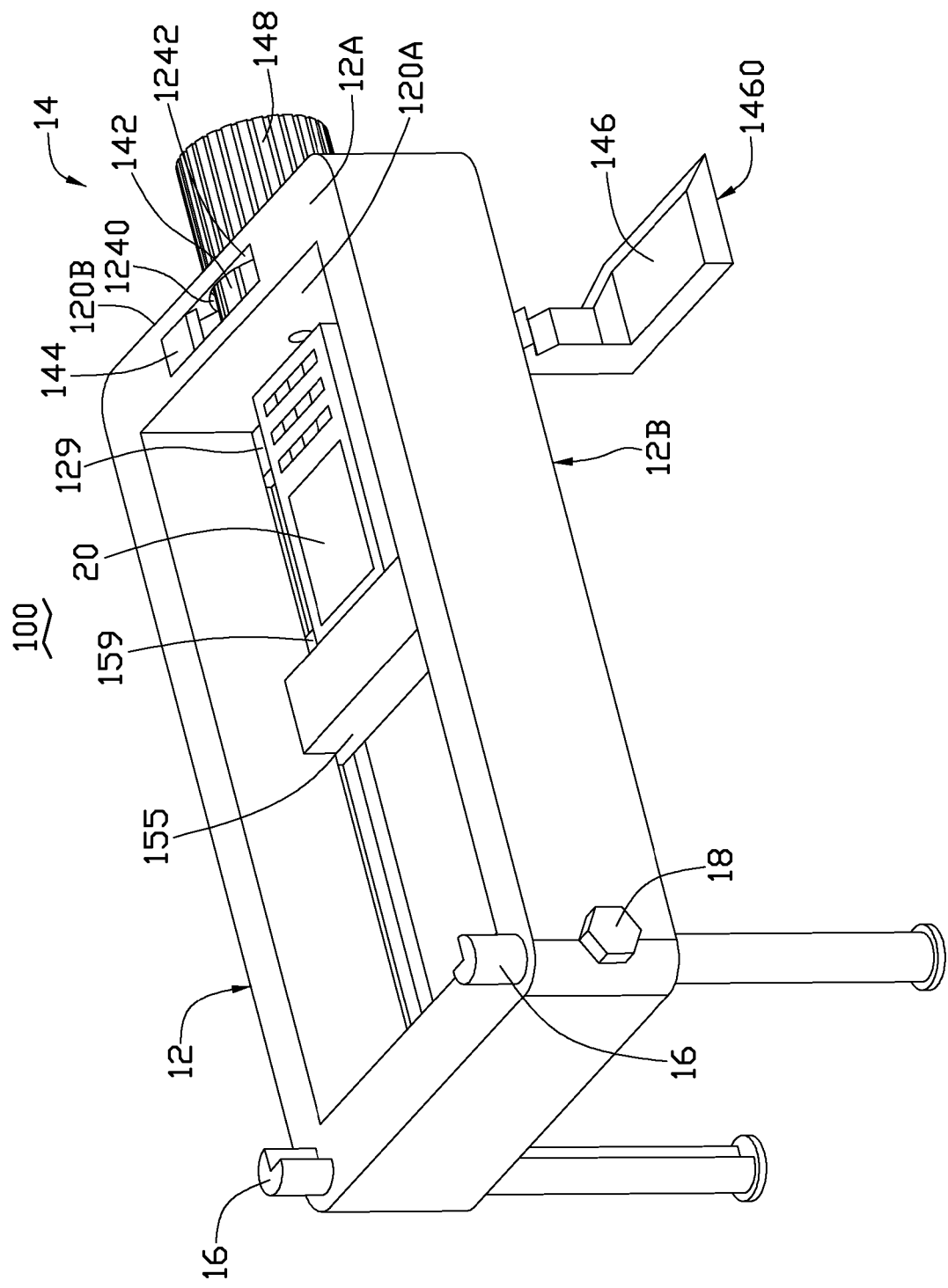
FIG. 3 is an isometric view of the camera holder of FIG. 1, together with a mobile phone.

As shown in FIG. 3, the gear rack 144 extends in a direction perpendicular to the bottom surface 12B. In this embodiment, the second side portion 124 has a groove 1242 defined in the top surface 12A. The groove 1242 extends all the way through the bottom surface 12B and communicates with the hole 1240. The groove 1242 is configured for allowing the gear rack 144 to pass therethrough (see FIG. 4).

Figure 4:
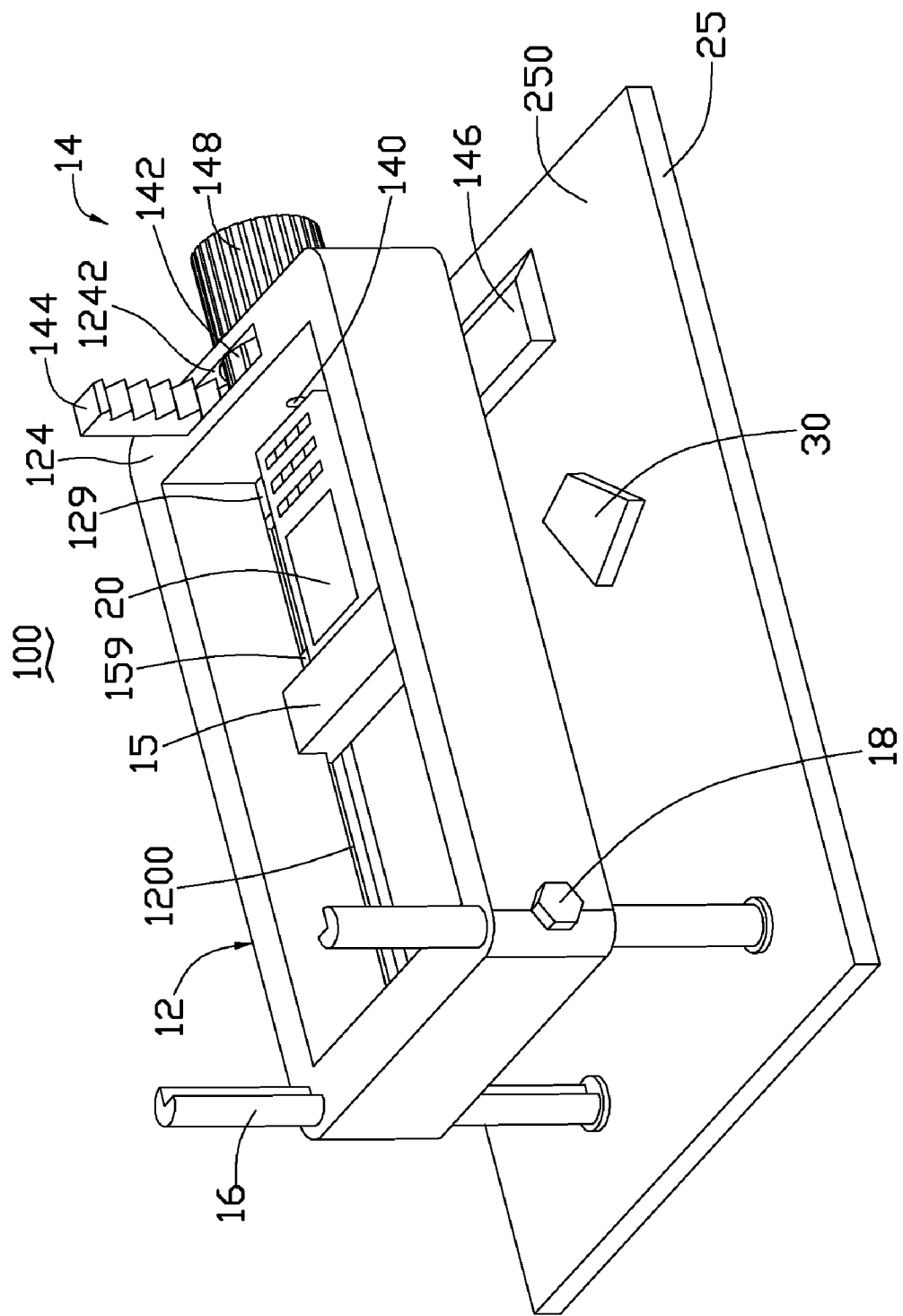
FIG. 4 is similar to FIG. 3, but showing that the mobile phone is in a lower position.

Referring to FIG. 2, FIG. 3, and FIG. 4, the base 146 is arranged on a horizontal plane 250 of a table 25 and attached to an end of the gear rack 144. In this embodiment, the base 146 has a flat bottom surface 1460 substantially parallel to the bottom surface 12B of the supporting frame 12. The flat bottom surface 1460 contacts the horizontal plane 250 when in use.

In this embodiment, the revolving head 148 is integrally connected to the gear 142. In alternative embodiments, the revolving head 148 and the gear 142 can be made separately and then attached to each other. The revolving head 148 extends all the way through the hole 1240 and protrudes from the outer side surface 120B of the second side portion 124 (see FIG. 3).

The revolving head 148 may be substantially cylindrical, and used to rotate the gear 142. A diameter of the revolving head 148 is substantially greater than that of the gear 142. In this embodiment, a rubber friction pad 1480 (see FIG. 2) can be provided and attached, or manufactured thereon, to a peripheral side surface (not labeled) of the revolving head 148. Thus, the revolving head 148 is convenient for the user to grasp.

The two supporting posts 16 are arranged on the horizontal plane 250. In this embodiment, the supporting frame 12 includes four corners (not shown) around the receiving cavity 120, and the supporting frame 12 has two through holes 12C (see FIG. 1) defined in the top surface 12A at two adjacent corners. One of the corners is located at an intersection of the first side portion 122 and the fourth side portion 128, and the other corner is located at an intersection of the third side portion 126 and the fourth side portion 128. The two supporting posts 16 pass through the two respective through holes 12C.

A cross section of each supporting post 16 may be circular sector (or circle sector). A configuration of each through hole 12C is shaped to conform to that of the corresponding supporting post 16. Thus, the supporting frame 12 and the supporting posts 16 cooperate to restrain rotation of the posts 16 relative to the supporting frame 12.

The holder 100 can be used to hold a camera. In one typical example for illustrating operation of holder 100, a mobile phone 20 with camera function is provided to pick up an image of an object 30, as shown in FIG. 4. In operation, the mobile phone 20 is arranged on the first supporting portion 129 and the second supporting portion 159. A camera module (not shown) equipped in the mobile phone 20 is oriented toward the object 30. The block 15 can be moved along the two slots 1200 for fittingly adjusting for mobile phones 20 with different lengths on the first supporting portion 129 and the second supporting portion 159. Subsequently, the revolving head 148 rotates the gear 142 about the shaft 140. Engagement of the gear rack 144 with the gear 142 allows the gear rack 144 to raise or lower the supporting frame 12 and the mobile phone 20 thereon relative to the horizontal plane 250. During movement of the supporting frame 12 relative to the horizontal plane 250, the two posts 16 can be used to guide the supporting frame 12 in a vertical direction. In this embodiment, as shown in FIG. 4, the mobile phone 20 is lowered toward the object 30. When the mobile phone 20 is located at an optimal position to pick up a close-up image of the object 30, two set screws 18 can be provided to lock the two posts 16 to the supporting frame 12. Thus, the two posts 16 and the base 146 cooperatively support the supporting frame 12, and the user can operates the mobile phone 20 to clearly pick up an image of the object 30.

In alternative embodiments, the camera holder 100 can be used to support a camera for picking up a close-up image. In addition, the camera holder 100 may include only one post 16 or more than two posts 16 for supporting the supporting frame 12.

One advantage of the cameral holder 100 is that the mobile phone 20 can be supported on the supporting frame 12 at an optimized position for picking up a close-up image of the object 30. Thus, vibration of the mobile phone 20 is avoided when the mobile phone 20 picks up close-up images, thus the mobile phone 20 can be used to pick up clear images of the object 30.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A camera holder comprising:
   a supporting frame comprising a receiving cavity;
   a sliding block received in the receiving cavity and slidably attached to the supporting frame, the sliding block and the supporting frame configured for cooperatively supporting a camera in the receiving cavity; and
   an adjustable assembly comprising:
      a shaft attached to the supporting frame,
      a gear mechanically coupled to the shaft,
      a gear rack meshed with the gear rack,
      a base arranged on a horizontal plane and attached to an end of the gear rack for supporting the supporting frame,
      a substantially cylindrical revolving head attached to the gear, the revolving head being configured for rotating the gear such that the gear and the gear rack cooperatively raise or lower the camera relative to the horizontal plane, and
      a rubber friction pad attached to a peripheral side surface of the revolving head.

2. The camera holder of claim 1, further comprising at least one vertically oriented supporting post arranged on the horizontal plane, the supporting frame defining at least one through hole for receiving at least a portion of the at least one supporting post, the at least one supporting post being configured for guiding movement of supporting frame in a vertical direction.

3. The camera holder of claim 2, further comprising at least one set screw for locking the at least one supporting post to the supporting frame such that the supporting post and the supporting frame cooperatively support the supporting frame.

4. The camera holder of claim 2, wherein a cross section of the at least one supporting post is sector-shaped, a configuration of the at least one through hole is shaped to confirm to that of the corresponding supporting post.

5. The camera holder of claim 1, wherein the base comprises a flat surface facing the horizontal plane.

6. The camera holder of claim 1, wherein each of the supporting frame and the receiving cavity is substantially cuboid-shaped, the supporting frame comprises four corners around the receiving cavity, the at least one supporting post comprises two supporting posts respectively received in two adjacent corners of the supporting frame.

7. The camera holder of claim 6, wherein the shaft of the adjustable assembly is attached to an opposite side of the supporting frame to the supporting posts.

8. The camera holder of claim 7, wherein the supporting frame has two parallel slots defined in an inner side surface thereof in the receiving cavity, and the sliding block comprises two protruding portion slidably engaged in the two respective slots.

9. The camera holder of claim 8, wherein the supporting frame has a hole defined in an outer side surface thereof receiving the gear, the revolving head protruding from the outer side surface.

10. The camera holder of claim 9, wherein the supporting frame has a groove extending through a top surface and a bottom surface thereof and communicating with the hole, each of the top surface and the bottom surface being substantially parallel to the horizontal plane, the gear rack extends in a direction substantially perpendicular to the horizontal plane through the groove.

11. The camera holder of claim 10, wherein each of the supporting frame and the sliding block has a supporting surface, the two supporting surfaces cooperatively supporting the camera.

12. A camera holder comprising:
   a supporting frame including a supporting portion;
   at least one supporting post extending through the supporting frame and adjustably movable relative to the supporting frame;
   a sliding block received in the supporting frame, the sliding block being slidable in the supporting frame along a horizontal direction, the supporting portion and the sliding block configured for cooperating to support a camera thereon;
   a vertically oriented gear rack;
   a gear coupled to the supporting frame and meshed with the gear;
   a substantially cylindrical revolving head attached to the gear, the revolving head being configured for driving the gear to move relative to the gear rack along a vertical direction, thus raising or lowering the supporting frame; and
   a rubber friction pad attached to a peripheral side surface of the revolving head.

\* \* \* \* \*